United States Patent
Outon Hernández et al.

(10) Patent No.: US 8,424,806 B2
(45) Date of Patent: Apr. 23, 2013

(54) AIRCRAFT COMPONENT WITH PANELS STIFFENED WITH STRINGERS

(75) Inventors: Ignacio Jorge Outon Hernández, Madrid (ES); Juan Zúñiga Sagredo, Madrid (ES); Alberto Arana Hidalgo, Madrid (ES); Emilio José Gutiérrez Santos, Madrid (ES)

(73) Assignee: Airbus Operations, S.L., Getafe, Madrid (ES)

( * ) Notice: Subject to any disclaimer, the term of this patent is extended or adjusted under 35 U.S.C. 154(b) by 417 days.

(21) Appl. No.: 12/726,621

(22) Filed: Mar. 18, 2010

(65) Prior Publication Data

US 2011/0174927 A1   Jul. 21, 2011

(30) Foreign Application Priority Data

Jan. 15, 2010   (ES) .................................. 201030037

(51) Int. Cl.
*B64C 1/06* (2006.01)
*B64C 3/18* (2006.01)

(52) U.S. Cl.
USPC ........................................ 244/123.1; 244/131

(58) Field of Classification Search .............. 244/117 R, 244/119, 123.1, 126, 131
See application file for complete search history.

(56) References Cited

U.S. PATENT DOCUMENTS

2005/0211846 A1*   9/2005   Leon-Dufour et al. ........ 244/126
2010/0127122 A1*   5/2010   Cosentino ................ 244/117 R

FOREIGN PATENT DOCUMENTS

WO   2008/132498   11/2008

* cited by examiner

*Primary Examiner* — Joseph W Sanderson
*Assistant Examiner* — Valentina Xavier
(74) *Attorney, Agent, or Firm* — Michael Best & Friedrich LLP

(57) ABSTRACT

Aircraft component with panels (11) stiffened with stringers (15) configured with a central section (17) and some feet (19) in which there are zones of potential intersections or interferences of said stringers (15) with spars (25) and ribs (27), in which the configuration of the ends of the stringers (15) affected by said intersections or interferences includes a first section (41) in which the height of the central section (17) of the stringer (15) is reduced until it disappears and the width of the feet (19) is increased until it reaches a predetermined width A and a second section (43) with some extended feet (23) of said predetermined width A and no central section (17), including in said first section (41) the mechanical means (31) for binding the end of the stringer (15) to the skin (13). The invention also relates to a method for manufacturing said panels (11).

6 Claims, 2 Drawing Sheets

AIRCRAFT COMPONENT WITH PANELS STIFFENED WITH STRINGERS

SCOPE OF THE INVENTION

This invention relates to an aircraft component with panels stiffened with stringers and, more specifically, to an improved configuration of the ends of the stringers in zones of intersection or potential interference with other structural elements.

BACKGROUND TO THE INVENTION

Many aircraft components manufactured with composite materials use panels stiffened with stringers whose designs have zones of intersection or interference with other structural elements of the component.

So for example, in the wing of an aircraft, the reinforcing stringers of the skin panels are crossed by the ribs and the ends of some of them may be arranged in zones close to the spars creating potential interferences.

If the ends of the stringers ("run-outs") are configured with no shape variation the problem arises that, in those zones of the panel that are not stiffened by stringers due to the impracticability of extending some of them on account of the potential interference or intersection with a rib or spar, we find some zones in which it is necessary to increase the thickness of the panel and consequently its weight. Furthermore, in the termination zone of a stringer a modification occurs in the load distribution between the panel and the stringer which causes certain problems.

To overcome these problems there are several known proposals in the prior art to configure the ends of the stringers used in stiffened panels such as those mentioned. WO 2008/132498 describes a solution to the problem of load distribution and in the detailed description of the invention we will mention proposed configurations of the ends of the stringers to reduce the unstiffened zones of the panel that have various drawbacks which this invention is intended to overcome.

SUMMARY OF THE INVENTION

One of the objectives of this invention is to provide a termination of a stiffening stringer of a panel of an aeronautical structure made of composite material, i.e. a material with an organic matrix and continuous fibres principally based on epoxy resins and carbon fibres, which enables the stringer to be as long as possible without interfering with other elements of the structure such as spars or ribs in order to optimise the weight of the panel.

Another objective of this invention is to provide a termination of a stiffening stringer of a panel of an aeronautical structure made of composite material that facilitates the reduction of its size and, in particular, of its width.

In one aspect, these and other objectives are achieved in an aircraft component that comprises at least one panel of composite material, formed by a skin and a plurality of stiffening stringers configured with a central section and some feet, as well as spars and ribs connected to said panel, the arrangement of said stringers and said spars and ribs including zones of intersection or potential interference between them, by means of a configuration of the end of a stringer in one of said zones of intersection or potential interference that includes a first section in which the height of the central section of the stringer decreases until it disappears and the width of the feet increases until it reaches a predetermined width A and a second section with some extended feet of said predetermined width A and no central section, including in said first section the mechanical means to bind the end of the stringer to the skin of the panel.

In a preferred embodiment, said stringer end is located in a zone of intersection with a rib, the feet of the rib being bound to the second section of the end of the stringer. This results in a stringer termination that does not require the rib to have a mousehole.

In another preferred embodiment, said stringer end is located in a zone near to a spar without interfering with it in any way thanks to the reduced width of the extended feet. This prevents the end of the stringer from interfering with a nearby spar which optimises the weight of the panel by obviating the need to reduce the length of the stringer and increase the thickness of the panel in the zone not stiffened by the stringer.

In another preferred embodiment, said predetermined width A of said extended feet is between 125-135% of the width of the feet of the stringer. This results in a stringer termination of a width able to optimise the weight of the panel, particularly in the case of panels that are part of the skin of a wing of an aircraft.

In another aspect, the objectives mentioned are achieved using a method of manufacturing the panel mentioned in which two L-shaped preforms are used to form the stringers and in which the different steps required to manufacture them include a step in which the slot between said preforms at the end of the stringer, following the disappearance of the central section, is filled with "roving".

Other features and advantages of this invention are set out in the following detailed description of the embodiments which illustrate their purpose in relation to the figures attached.

DETAILED DESCRIPTION OF THE INVENTION

For a better understanding of the invention we will first describe a zone of the wing of an aircraft with a stringer terminated in a typical manner known in the prior art and then the same zone with a stringer terminated according to this invention.

Figure 1:
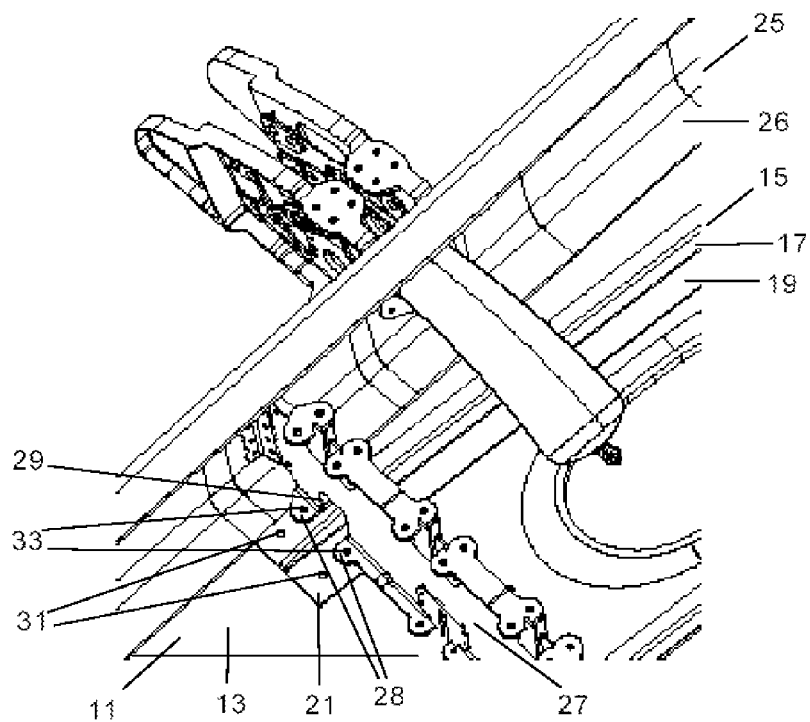
FIGS. 1 and 2 are respectively perspective and plan views of the inside of an aircraft wing showing the typical termination (known in the prior art) of a stiffening stringer in a zone in which there is interference with a spar.
Figure 2:
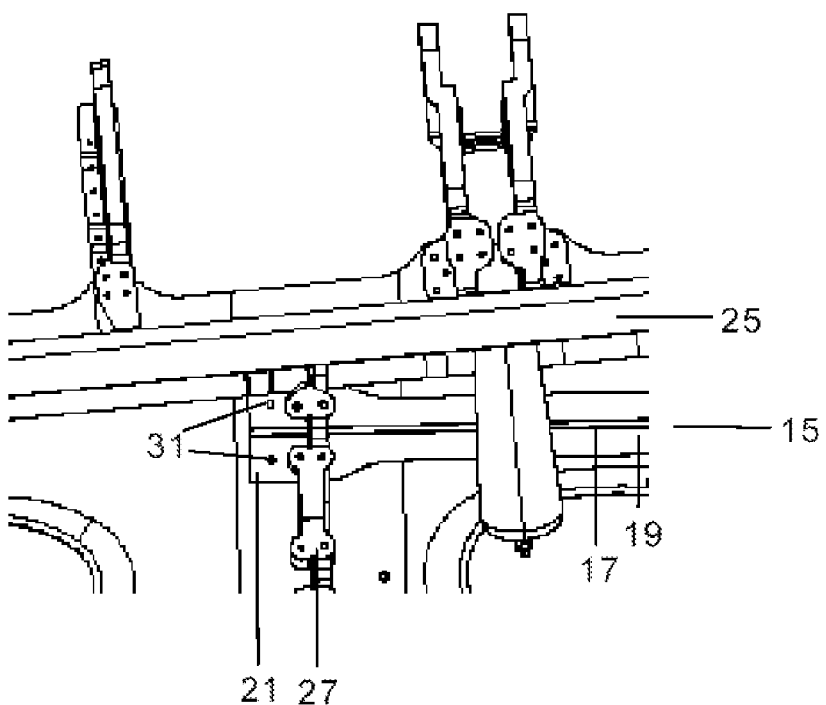

FIGS. 1 and 2 show the inside of a zone of the wing of an aircraft with a spar 25, a rib 27 and a panel 11 formed by a skin 13 and a stiffening stringer 15 with a central section 17 and some feet 19.

The termination of the stringer 15 is configured in a known manner with some widened feet 21 in which the central section 17 decreases in height until it disappears, some metal rivets 31 being placed therein as binding means between the stringer 15 and the skin 13 complementary to the chemical binding means used in a co-curing or co-gluing process, typical in the manufacture of composite-material elements.

The progressive reduction in the height of the central section 17 of the stringer 15 is a means well known in the prior art of facilitating the transfer of load from the skin 13 to the stringer 15 by providing a gradual increase in the flexural and tensile rigidity and preventing local load concentrations. In turn the widening of the feet 21 facilitates a combined response of stringer 15 and skin 13 to the loads to which the panel 11 is subjected. The mechanical rivets 31 are necessary to prevent delaminations and/or failures of the chemical bond between the stringer 15 and the skin 13.

In turn FIGS. 1 and 2 show that when the stringer 15 terminates after an intersection with a rib 27, this latter must have a mousehole 29 for the stringer 15 and the widened feet 21 must be large enough to accommodate the central section 17 of the stringer 15, to leave enough room for the feet 28 of said rib 27 and to enable the placement therein of the fixing means (normally four screws 33) of the feet 28 of said rib 27 that are situated at a relatively large distance from each other as a result of the existence of said mousehole 29.

FIGS. 1 and 2 show a situation in which there is interference between the termination of the stringer 15 and the foot 26 of the spar 25 which would prevent the stringer 15 from reaching the rib 27 and cause it to terminate in a prior rib requiring the affected zone of the skin 13 to be thicker thus increasing the weight of the panel 11. One of the causes of these interferences is the width of the feet 21.

Figure 3:
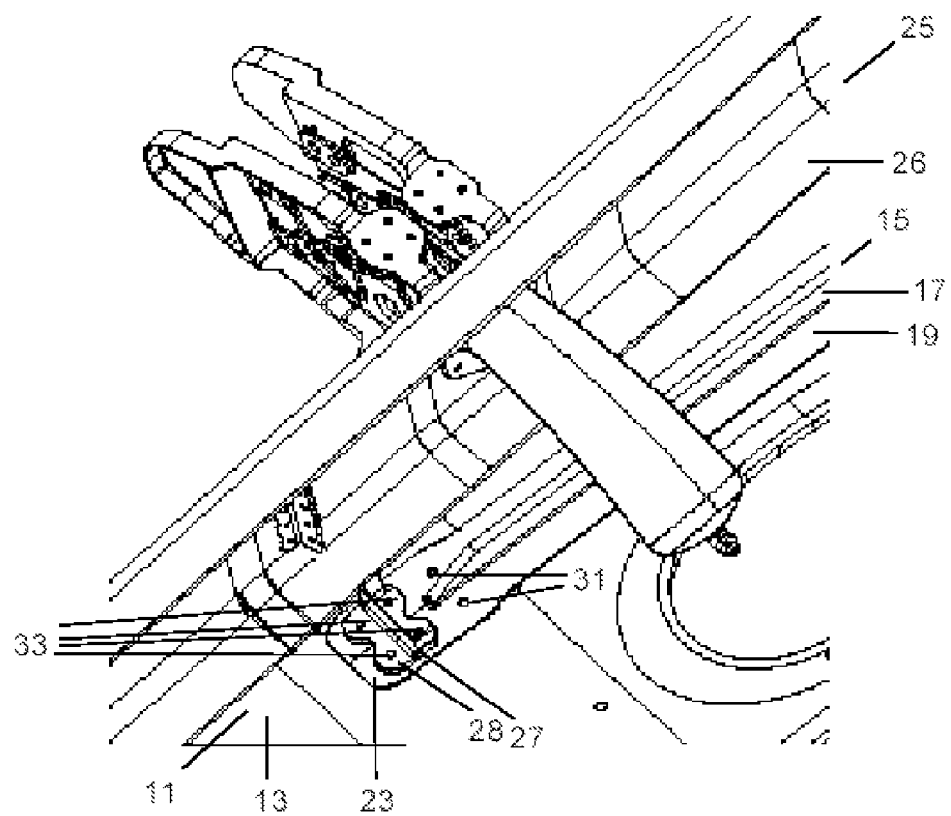
FIGS. 3 and 4 are perspective views from the inside of an aircraft wing that show the termination of a stiffening stringer according to this invention in the same zone shown in FIGS. 1 and 2.
Figure 4:
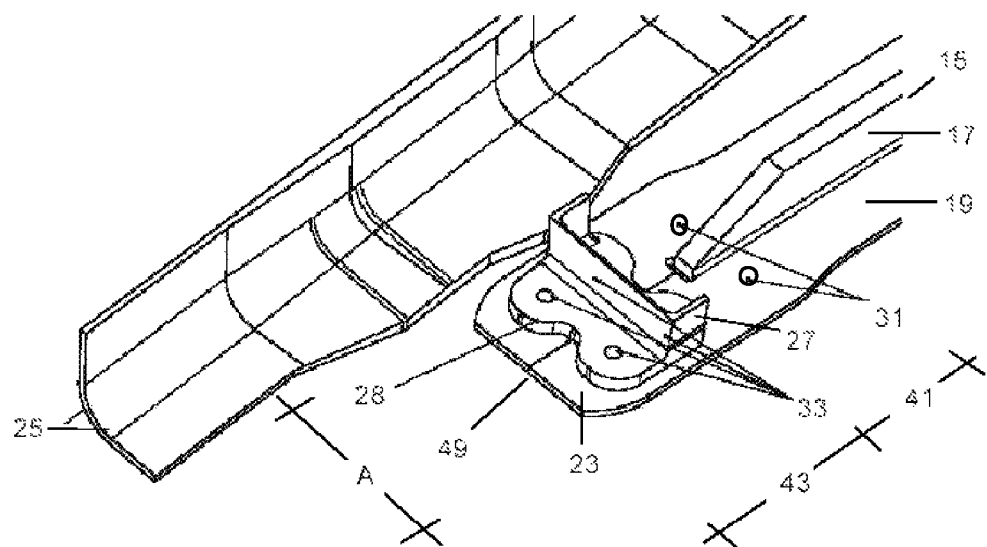

Describing a preferred embodiment of this invention, FIGS. 3 and 4 show that the termination of the stringer 15 includes a first section 41 in which there is a progressive reduction in the central section 17 of the stringer 15, in which are located the mechanical rivets 31 required to prevent delaminations and/or failures of the chemical bond between the stringer 15 and the skin 13, and a second section 43 with some feet 23 of a width A sufficient to accommodate the fixing means (usually four screws 33) of the feet 28 of said rib 27 which may be located at a much smaller distance compared to the termination known in the prior art since, in this case, the mousehole 29 is not required. This reduces the possibility of interferences with the foot 26 of the spar 25.

It is assumed that the width A of the extended feet 23 of a termination of a stringer 15 according to this invention is in the range 125%-135% of the width of the feet 19 of the stringer 15 while in the known termination this width is between 145%-155%.

The skin 13 is typically manufactured using a first stage involving stacking layers of "prepreg" (carbon fibres or fibre bundles soaked in a thermostable or thermoplastic resin matrix in the form of pre-impregnated material) using ATL machines and a second curing stage in an autoclave.

The stringer 15 is typically manufactured by shaping in a suitable tool two L-shaped preforms using several stacks of prepreg. It is then well cured together with the skin 13 or separately in which case it is attached to it subsequently using adhesive means.

In any case, the use of two preforms may result, once the stringer has been shaped, in the existence of a slot 49 between the two preforms that, as appropriate, would be filled with "roving" (unidirectional strips of fibre of the same material or of a material compatible with the material of the preforms).

The advantages of this invention include notably the following:

Narrower feet of the stringer in its termination zone.
Reduced risk of interference between the stringer and the foot of the spar.
Possibility of greater stringer length.
Reduced width (weight) of the panel.
Possibility of eliminating stringer mouseholes in ribs.

Although this invention has been described in full in relation to the preferred embodiments, it is clear that any modifications within its scope can be included, this scope not being limited by the foregoing embodiments, but by the content of the claims below.

The invention claimed is;

1. Aircraft component that comprises at least one panel (11) of composite material, the panel (11) being formed by a skin (13) and a plurality of stiffening stringers (15) configured with a central section (17) and feet (19), as well as spars (25) and ribs (27) connected to said panel (11), an arrangement of said stringers (15) and said spars (25) and ribs (27) including zones of one intersection and potential interference between said stringers (15) and said spars (25) and ribs (27), characterised in that the configuration of an end of a stringer (15) in one of said zones, includes a first section (41) in which the height of the central section (17) of the stringer (15) tapers down toward extended feet (23) to a tapered end and the width of the feet (19) increases until the width reaches a predetermined width (A) and a second section (43) with the extended feet (23) of said predetermined width (A) and no central section (17), including in said first section (41) mechanical means (31) to bind the end of the stringer (15) to the skin (13).

2. Aircraft component according to claim 1, characterised in that said stringer (15) end is located in one of said zones with a rib (27), the feet (28) of the rib (27) being bound to the second section (43) of the end of the stringer (15).

3. Aircraft component according to claim 2, characterised in that said stringer (15) end is located in said one of said zones near to a spar (25) without interfering with the spar (25) in any way due to the reduced width of the extended feet (23).

4. Aircraft component according to claim 1, characterised in that said predetermined width (A) of said extended feet (23) is between 125-135% of the width of the feet (19) of the stringer (15).

5. Aircraft component according to claim 1, characterised in that said panel (11) belongs to the skin of a wing.

6. Manufacturing method for the panel (11) of claim 1, characterised in that to shape the stringers (15) two L-shaped preforms are used and in that during manufacturing the panel (11) there is a step in which a slot (49) between said preforms in the end of the stringer (15), following the tapered end of the central section (17), is filled with roving.

* * * * *